(No Model.)
F. LAMBERT.
DEVICE FOR TESTING METERS.
No. 603,485. Patented May 3, 1898.
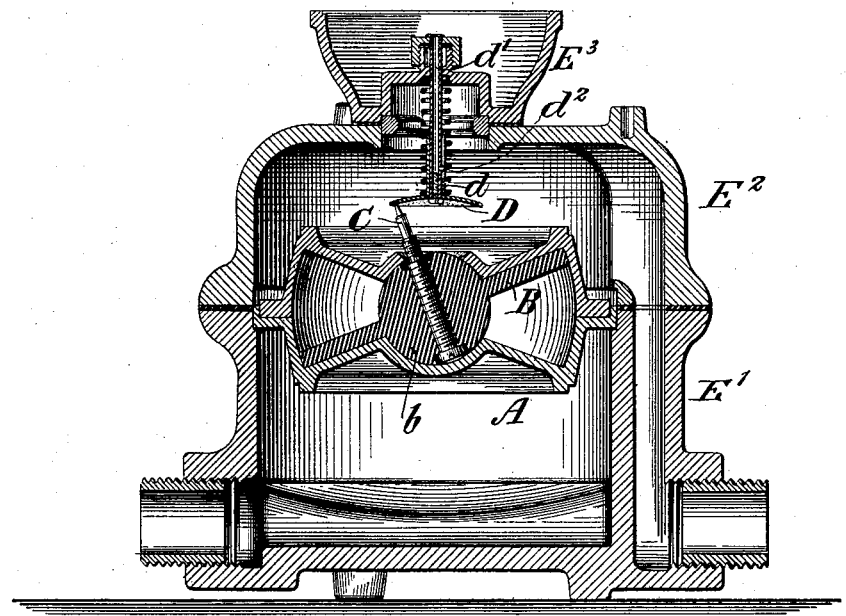
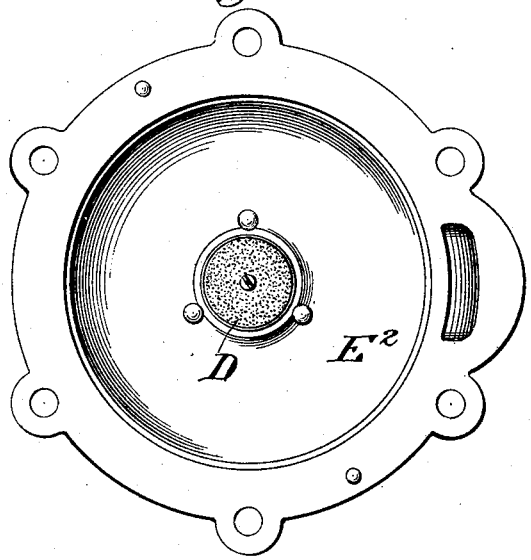
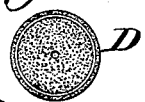
WITNESSES:
INVENTOR
FRANK LAMBERT
BY
HIS ATTORNEY.

UNITED STATES PATENT OFFICE.

FRANK LAMBERT, OF BROOKLYN, NEW YORK, ASSIGNOR OF ONE-HALF TO JOSEPH W. KAY, OF SAME PLACE.

DEVICE FOR TESTING METERS.

SPECIFICATION forming part of Letters Patent No. 603,485, dated May 3, 1898.

Application filed April 14, 1896. Serial No. 587,549. (No model.)

*To all whom it may concern:*

Be it known that I, FRANK LAMBERT, of Brooklyn, in the county of Kings and State of New York, have invented a certain new and useful Improvement in Devices for Testing Meters, of which the following is a specification.

My improvement relates particularly to nutating-disk meters; and the object of the improvement is to provide devices to make tests for ascertaining the action of the nutating disks of such meters.

I will describe devices embodying my improvement and then point out the novel features in the claims.

In the accompanying drawings, Figure 1 is a central vertical section of a meter-chamber, a nutating disk fitted therein, a casing inclosing such chamber and provided with suitable inlet and outlet ports, and other devices embodying my improvement. Fig. 2 is an inverted plan of the upper part of the casing and parts connected therewith. Fig. 3 is an inverted plan view of a record-plate. Fig. 4 is a similar view of another record-plate.

Similar letters of reference designate corresponding parts in all the figures.

A designates a meter-chamber, and B a nutating disk or piston fitted therein, both being of the usual or any suitable construction. It will be understood that the nutating disk is caused to nutate by liquid admitted at one point of the chamber and allowed to escape at the other. It will be seen that, as is common in such disks, it has a central spherical portion $b$. From this spherical portion $b$ extends axially a spindle or marker C. This may be attached temporarily and for this purpose is shown as provided with engaging screw-threads. Such screw-threads not only fasten the spindle to the disk, but also serve as a means for adjusting its outer end, so that it may have precisely the desired projection.

D designates a record-plate, here shown as of circular form and as concavo-convex. It is to be of such a size in contour that the end of the spindle or marker B may continue in contact with it regardless of whether the disk or piston B is operating properly or not. This plate is fastened to a tubular shank $d$, which fits upon a rod $d'$, attached to the cover $E^3$ of a casing $E'$ $E^2$ $E^3$. A spring surrounds the tubular shank and rod between the plate and the cover, so as to press the plate downwardly and maintain contact between it and the spindle or marker.

The tubular shank $d$ is longitudinally slotted for a portion of its length, and a radial pin $d^2$ projects into it from the rod $d'$.

The under side of the plate may be scratched by the marker or may be coated with any suitable substance which will facilitate the making of a record by the marker—as, for example, a suitable oil-paint may be used as a coating for the under side of the plate where the tests of the meter are to be made with water.

The casing $E'$ $E^2$ $E^3$ may be of any suitable form.

If the disk or piston of the meter operates properly and hence does not tilt out of its proper position during its nutations, it will maintain proper contact with the chamber and a perfectly circular record will be made by the marker upon the record-plate, as indicated in Fig. 3. If, however, the disk or piston should not operate properly, the defect in its operation will be indicated by some deviation from a circular line, as indicated, for example, by Fig. 4.

The record-plate may be removed at any time and replaced by another.

What I claim as my invention, and desire to secure by Letters Patent, is—

1. In a fluid-meter having a nutating-disk valve a spindle therefor, and a valve-chamber, a record-surface supported in proximity to said spindle end and adapted to be marked by said spindle during the nutation of said valve to record the various angles of nutation, substantially as described.

2. In a fluid-meter having a nutating-disk valve a spindle therefor, and a valve-chamber, a record-surface supported in proximity to said spindle end and adapted to be marked by said spindle during the nutation of said valve and means for adjusting said spindle in said valve with reference to said record-surface, whereby the various angles of nutation of the disk are recorded, substantially as described.

3. In a fluid-meter having a nutating-disk valve, a spindle therefor, and a valve-chamber, a record-surface supported in proximity to said spindle end and adapted to be marked by said spindle during the nutation of said valve and means for adjusting said record-surface with reference to said spindle, whereby the various angles of nutation of the disk are recorded, substantially as described.

4. In a fluid-meter having a nutating-disk valve, a spindle therefor, a valve-chamber and an inclosing casing, a record-surface supported within said casing and in proximity to said valve-spindle and adapted to be marked by said spindle to record the various angles during the nutation of said valve, substantially as described.

5. In a fluid-meter having a nutating-disk valve, a spindle therefor, and a valve-chamber, a record-surface supported in a plane at right angles to the axis of the valve-chamber and also in proximity to said valve-spindle and adapted to be marked by said spindle to record the various angles during the nutation of said valve, substantially as described.

6. In a fluid-meter having a nutating-disk valve, a spindle therefor and a valve-chamber, a record-plate supported in a plane at right angles to the axis of the valve-chamber, and means acting upon said record-plate to hold it in contact with the extremity of said spindle, substantially as specified.

7. In a fluid-meter having a nutating-disk valve, a spindle therefor and a valve-chamber, a record-plate supported in a plane at right angles to the axis of the valve-chamber and a spring acting upon said record-plate to hold it in contact with the extremity of said spindle whereby the various angles of nutation of the disk are recorded, substantially as described.

8. In a fluid-meter having a nutating-disk valve, a spindle therefor and a valve-chamber, a concave record-plate—said concavity conforming to the path of said spindle end in nutating supported with its periphery in a plane at right angles to the axis of the valve-chamber and with its center in line with said axis, and disposed in proximity to said spindle end so as to be marked by said spindle during the nutation of the valve, substantially as described.

In testimony whereof I have signed my name to this specification in the presence of two subscribing witnesses.

FRANK LAMBERT.

Witnesses:
ANTHONY GREF,
JOSEPH W. KAY.